United States Patent [19]

Liepelt

[11] 3,787,748

[45] Jan. 22, 1974

[54] FREQUENCY TUNER OF A RESONATOR FOR A KLYSTRON

[75] Inventor: Klaus Liepelt, Buxtehude, Germany

[73] Assignee: U.S. Philips Corporation, New York, N.Y.

[22] Filed: Oct. 27, 1972

[21] Appl. No.: 301,531

[30] Foreign Application Priority Data

Nov. 4, 1971 Germany.................... P 21 54 745.5

[52] U.S. Cl................... 315/5.46, 315/5.53, 333/83

[51] Int. Cl............................................. H01j 25/10

[58] Field of Search.... 315/5.46, 5.53, 5.54; 333/83

[56] References Cited

UNITED STATES PATENTS

| | | | |
|---|---|---|---|
| 3,105,167 | 9/1963 | Broderick | 315/5.53 |
| 3,351,805 | 11/1967 | Hoxie | 315/5.54 X |
| 3,045,146 | 7/1962 | Haegele et al. | 315/5.53 X |
| 2,860,281 | 11/1958 | Young et al. | 315/5.53 |
| 3,264,513 | 8/1966 | Bagnall | 315/5.54 X |
| 3,530,331 | 9/1970 | Huntley et al. | 315/5.46 X |

*Primary Examiner*—James W. Lawrence
*Assistant Examiner*—Saxfield Chatmon, Jr.
*Attorney, Agent, or Firm*—Frank R. Trifari

[57] ABSTRACT

A non-deformable resonator surrounds high frequency interaction gap between two opposite drift members. Each drift member is secured to a fixed support. Resilient annular suspension discs are secured in vacuum tight manner between the resonator and the support member to allow position adjustment of the resonator along the axis of the drift members.

6 Claims, 3 Drawing Figures

FREQUENCY TUNER OF A RESONATOR FOR A KLYSTRON

The invention relates to a frequency tuner of a resonator for a klystron, in particular for a VHF klystron, with a metal resonator wall which surrounds the rigidly secured drift spaces and the HF interaction gap and which is constructed so as to be movable in the axial direction in such a manner that the volume of the resonator remains unvaried during tuning.

A frequency tuner of a resonator for a klystron is known from British Pat. specification No. 582,486 in which a different volume of the resonator and hence a frequency tuning is obtained in the desirable manner by moving the wall of the resonator. This frequency tuning may extend over a large range but presents problems in multicavity klystrons and in this case is shown only in principle. The most important structural properties of the klystron, namely the sealing of the resonator, is effected in this case by dividing the resonator into an inner space - present inside a glass envelope - and an outer space - present under atmospheric pressure - , the frequency tuning occurring by varying the volume of the outer space.

A similar arrangement is shown in French Pat. specification No. 960,756. In this case also a division is effected by dividing the resonator into an evacuated resonator part and a non-evacuated resonator part, the tuning occurs by a cap screw which is provided with internal screwthread and which has a shoulder which gives the inside diameter a different dimension. By moving the edge of said shoulder in the axial direction, a variation of the volume of the resonator is obtained in this case also.

French Pat. specification No. 878,920 on the contrary shows a resonant cavity which is built on the outside of the klystron and in which bellows are arranged. Said bellows can be contracted by an operating device arranged outside the resonator and thus produce a frequency variation. In this arrangement, the vacuum-tight leading-through of the operating rod is particularly critical because relatively movable parts have simultaneously to be closed in a vacuum-tight manner.

Dutch published Pat. application No. 105,895 also shows the resonator of a klystron into which the two fixedly secured drift spaces enter but which is again divided into an inner evacuated resonator and an outer non-evacuated resonator. In this arrangement the metal wall of the outer resonator can be moved slightly in the axial direction for purposes of frequency tuning. In contrast with the above-mentioned arrangement, however, the volume of the resonator remains constant in this case. The vacuum sealing of the inner resonator shown in this case presents problems, however, because with considerable temperature variations during operation, the ceramic-metal seals have proved to be unsatisfactory.

So it was the object of the invention to provide a frequency tuner of a resonator for a klystron in which the sealing problems of the vacuum against atmospheric pressure are solved simultaneously with a tuning possibility by moving the wall of the resonator. The volume of the resonator during tuning should remain unvaried.

In a frequency tuner of the type mentioned in the preamble, this problem is solved according to the invention in that the movable suspension of the wall of the resonator is constructed in a vacuum-tight manner.

The suspension may consist of at least two diaphragm-like perforated discs. The suspension may also consist of four diaphragm-like perforated discs. Furthermore, operating cams may be provided on the outer jacket of the wall of the resonator. In a further embodiment of the invention a guide fork which is movable in the axial direction and whose limbs surround the resonator wall at least in the form of a semicircle may be arranged at the level of the resonator on the klystron. A suspension fork, whose limbs surround the wall of the resonator to the level of the cam and in whose bearing dishes the cams can be provided may be arranged on the klystron so as to be swingable.

This arrangement according to the invention has the advantage that a division of the resonator into an evacuated and a non-evacuated part is avoided. The critical metal-ceramic soldered joints are simultaneously avoided because the joints of the diaphragm can be welded together. The metal-metal-solder joints on the wall of the resonator and at the poleshoes are not critical.

Embodiments of the invention are shown in the drawings and will be described in detail below.

Figure 1:
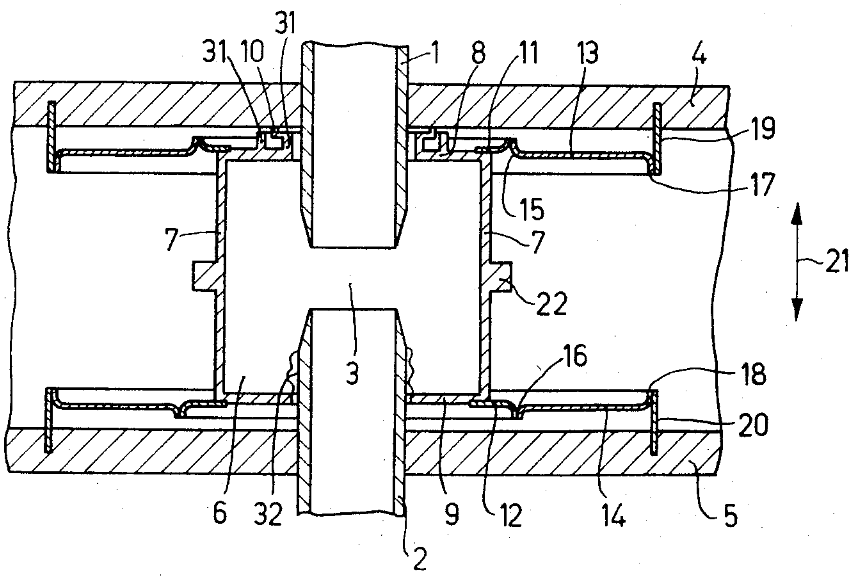
FIG. 1 is a sectional view of a frequency tuner for a resonator of a VHF multi-cavity klystron.

Referring now to FIG. 1, reference numerals 1 and 2 denote the rigidly secured drift spaces of a multi-cavity VHF klystron, for example, for the frequency range around 12 GHz. The HF interaction gap 3 is present between the drift spaces 1 and 2. The drift spaces 1 and 2 are rigidly secured in the pole-shoes 4 and 5 which, for guiding the magnetic field, usually consist of soft iron.

The resonator space 6 is surrounded by a resonator wall 7 which consists substantially of a hollow cylinder whose end faces 8 and 9 have corresponding apertures for receiving the drift spaces 1 and 2. Special projections 31 extending axially are present on the end face 8 and cooperate with a projection 10 on the poleshoe 4 and form a capacity trap so that no high frequency can emanate from the resonator space 6 at this area. Miniature bellows 32 may be inserted as a further high frequency termination. Metal, diaphragm-like annular discs 11 and 12 are welded to the resonator wall 7 and partly engage the end faces 8 and 9, respectively. Said soldering joint is not critical because actually both the resonator wall 7 with the two end faces 8 and 9 and said two diaphragm-like annular discs 11 and 12 consist of metal. Further diaphragm-like annular discs 13 and 14 are welded at 15 and 16 to the diaphragm-like annular discs 11 and 12 in the radial direction viewed to the outside, for example, by a so-called "plasma welding". This seal is not critical either because two equal metals are joined together. The same holds good for the vacuum-tight joints 17 and 18 between the outer diaphragm-like perforated discs 13 and 14 and the connection rings 19 and 20 which are welded in the poleshoes 4 and 5, respectively, with their one end.

Figure 2:
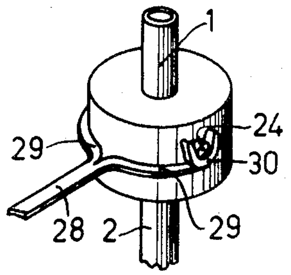
FIGS. 2 and 3 show operating devices for moving the wall of the resonator.
Figure 3:
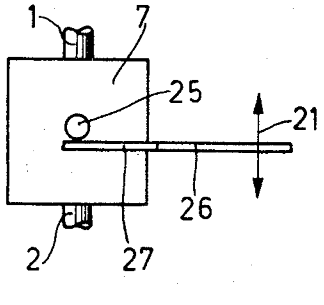

The resonator wall 7 with the two end faces 8 and 9 can be moved in the axial direction in the direction of the arrow 21. For that purpose, an annular projection 22 or, as is shown in FIGS. 2 and 3, actuation cams 24 or 25 are provided on the outer jacket of the resonator wall 7. In the same manner as with the rings 22, said actuation cams 24 and 25 may be manufactured from the same material and be formed integral with the resonator wall.

FIGS. 2 and 3 show possible actuation types, namely the simpler of the two in FIG. 3. This Figure shows the arrangement of an axially movable guide fork 26 whose limbs 27 surround the resonator wall 7 at least in the form of half a circle. The guide fork 26 is secured at the level of the resonator to the klystron by means of known measures.

A further embodiment is shown in FIG. 2. In this case the suspension fork 28 consists of a stem and two limbs 29. Bearing dishes 30 are present on said limbs 29 and are adapted to the actuation cams 24. In this embodiment the suspension fork 28 can be journalled to the klystron so as to be pivotal by means of known measures.

To be considered as materials for the resonator wall 7 as well as the end faces 8 and 9 are, for example, copper, bronze, V2A steel or nickel-copper (the latter two metals with refined surface). To be considered for the perforated discs 11, 12, 13 and 14 and for the connection rings 19 and 20 are copper, fernico, nickel, bronze or V2A steel.

What is claimed is:

1. A frequency tuner for a klystron having two support members arranged in a spaced relation from each other, two opposite tubular drift members secured to said support members, respectively, and defining a high frequency interaction gap therebetween, a rigid metal resonator surrounding said gap and being movable in the space between said support members along the axis of said drift members, comprising resilient suspension members secured in a vacuum-tight manner between said resonator and said support members.

2. A frequency tuner as claimed in claim 1, characterized in that each suspension member includes at least one diaphragm-like annular disc.

3. A frequency tuner as claimed in claim 2, characterized in that each suspension member consists of two diaphragm-like annular discs.

4. A frequency tuner as claimed in claim 1 and further comprising actuation cams arranged on the outer jacket of the resonator.

5. A frequency tuner as claimed in claim 4, characterized in that an axially movable guide fork whose limbs surround the resonator wall at least over half a circle is secured to the klystron at the level of the resonator.

6. A frequency tuner as claimed in claim 4, characterized in that a suspension fork whose limbs surround the resonator wall up to the level of the cams and in whose bearing dishes the cams can be laid is secured to the klystron so as to be swingable.

* * * * *